Dec. 12, 1939.  E. H. JENKINS  2,183,479
SHINGLE MAKING OR WOOD SHAKE CUTTING MACHINE
Filed July 27, 1937  2 Sheets-Sheet 1
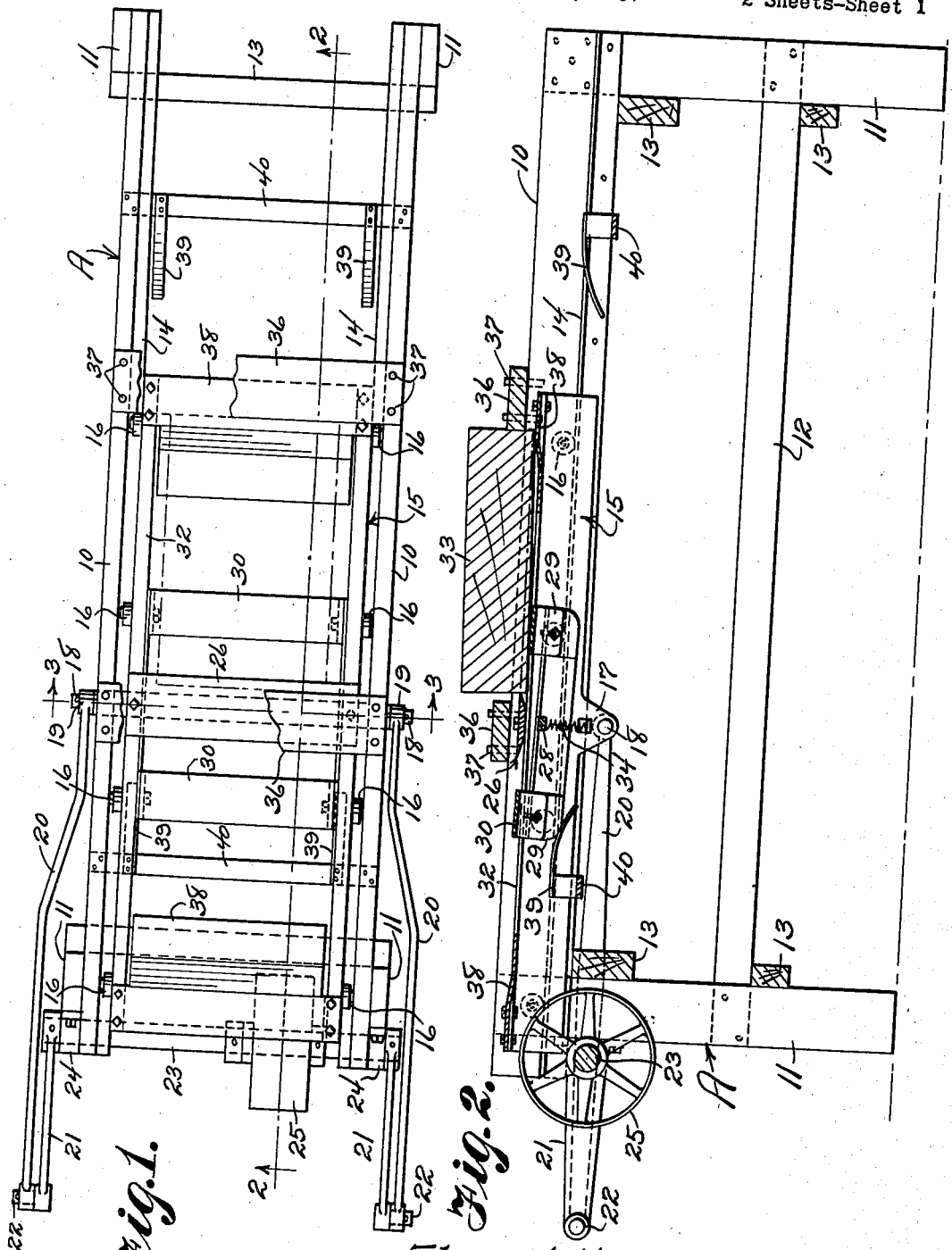
Elsworth H. Jenkins INVENTOR
BY Victor J. Evans & Co.
ATTORNEYS Dec. 12, 1939.  E. H. JENKINS  2,183,479
SHINGLE MAKING OR WOOD SHAKE CUTTING MACHINE
Filed July 27, 1937  2 Sheets-Sheet 2
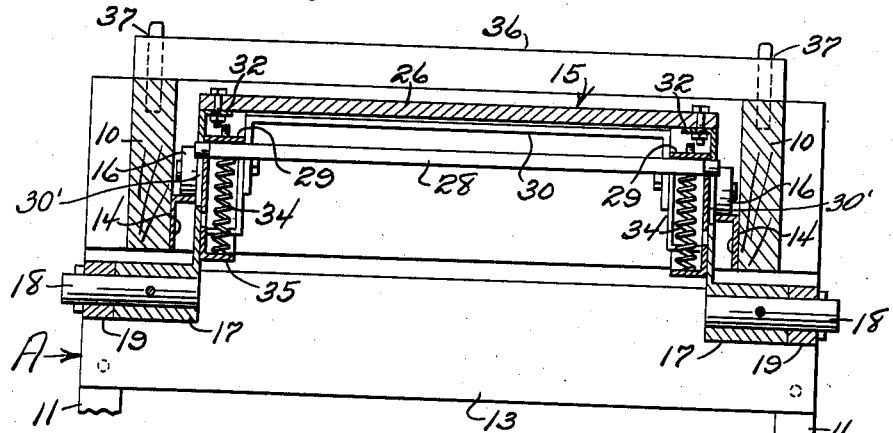
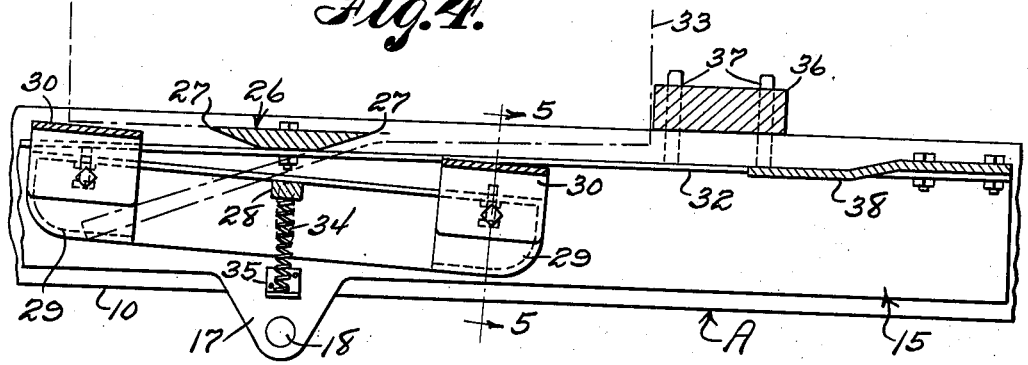
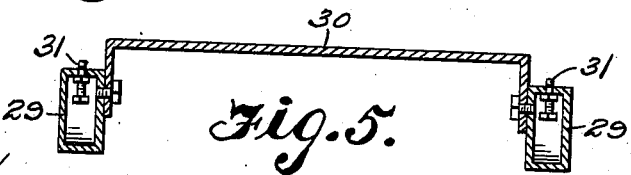
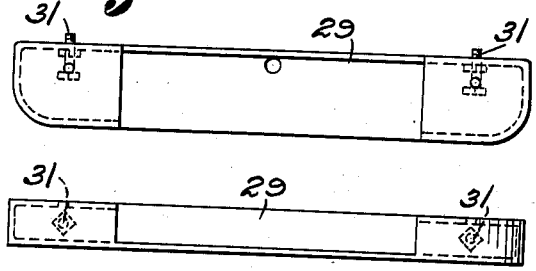
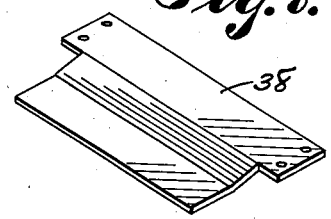
Elsworth H. Jenkins
INVENTOR
BY Victor J. Evans & Co.
ATTORNEYS Patented Dec. 12, 1939

2,183,479

UNITED STATES PATENT OFFICE 2,183,479

SHINGLE MAKING OR WOOD SHAKE CUTTING MACHINE

Elsworth H. Jenkins, North Bend, Wash.

Application July 27, 1937, Serial No. 155,970

2 Claims. (Cl. 144—162)

The invention relates to a shingle making or wood shake cutting machine and more especially to a reciprocatory power driven wood splitting machine.

The primary object of the invention is the provision of a machine of this character, wherein wood in block form can be held in a manner for the cutting or splitting thereof into shakes or shingles, the cutter being of the double cutting edge type and is reciprocated in the machine so as to enable the cutting or splitting operation to be carried forth with dispatch and under each stroke of the said cutter or blade through reciprocatory motion thereof.

Another object of the invention is the provision of a machine of this character, wherein the work holder is of novel construction and also the blade carrier is novel for the making of shakes or shingles economically and with dispatch.

A further object of the invention is the provision of a machine of this character, wherein the blade carriage under reciprocation assures double cutting action and the work being held for self-adjustment with relation to the cutter so that tapered shingles or shakes may be had.

A further object of the invention is the provision of a machine of this character, which is simple in its construction, thoroughly reliable and effective in operation, mechanically actuated, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view partly broken away of a machine constructed in accordance with the invention.

Figure 2 is a vertical longitudinal sectional view taken on the line 2—2 of Figure 1 looking in the direction of the arrows.

Figure 3 is a vertical transverse sectional view taken on the line 3—3 of Figure 1 looking in the direction of the arrows.

Figure 4 is an enlarged vertical longitudinal sectional view through the carriage.

Figure 5 is a sectional view on the line 5—5 of Figure 4 looking in the direction of the arrows.

Figure 6 is a side elevation of the work tilt gauge.

Figure 7 is a bottom plan view thereof.

Figure 8 is a perspective view of one of the fulcrum plates for the work in association with the carriage.

Similar reference characters indicate corresponding parts throughout the several views in the drawings.

Referring to the drawings in detail, A designates the main stand or frame of the machine involving spaced parallel upper or top side sills 10, vertical legs 11 and longitudinal and transverse braces 12 and 13, respectively, these being made fast to the vertical legs 11 while the sills 10 are fixed to the upper ends of said legs and through the use of the said braces the frame or stand is assured of rigidity and strength. At the inner faces of the side sills 10 and extended longitudinally of the frame or stand A are track rails 14, these being in the same plane with each other and are preferably made from inverted substantially L-shaped metal bars.

Arranged for reciprocation longitudinally of the frame or stand A is a skeleton carriage 15 having traction rollers 16 movable upon the track rails 14 for the travel of the said carriage in a horizontal plane and below the plane of the top edges of the side sills 10 of the frame or stand. The opposite sides of the carriage 15 medially thereof have formed therewith depending brackets 17 in which are arranged stud spindles 18, these being projected laterally and outwardly from opposite sides of the frame or stand A for the loose connection of pivot eye terminals 19 therewith of throw arms 20, these being pivoted at the other ends to turning cranks 21 as at 22, the cranks being fixed to a power shaft 23 journaled transversely of the frame or stand A at one end thereof in bearings 24 and this shaft carries a belt wheel or pulley 25 for a belt or the like (not shown) and operated from any suitable power source. Through the action of the cranks 21 on the rotation of the shaft 23, the carriage 15 will be reciprocated longitudinally in the frame or stand A traveling upon the track rails 14 therein.

Supported by the carriage 15 midway thereof and disposed crosswise of the same is a double cutting edge knife or blade 26, the double cutting edges 27 being reversely beveled while beneath the said knife or blade is a rocking gauge, its axle 28 being in vertical alignment with a knife or blade and involves side shoes 29 and crossed end gauge plates 30 joined with each other to effect a unitary structure, the rocking gauge being adapted for swinging movement on a horizontal axis constituted by the axle 28 which has its ends accommodated in vertical guide slots 30' formed in the sides of the carriage 15 while the shoes 29 at opposite ends thereof are hollow and carry adjustable screws 31, these being engageable with the side overhanging flanges 32 of the carriage 15 to limit the reverse tilting operation of the gauge to assure the proper set of a piece of work such as a wood block 33 to be split or cut for the shake splitting or shingle cutting operation of the machine through the instrumentality of the knife or blade 26. The axle 28 has acting thereon coiled tensioning springs 34, these being seated at 35, the seats being carried by the carriage 15 and are of sufficient tension to hold the said axle 28 elevated in the slots 30' in the carriage to have the gauge normally at a maximum raised position yet allowing the latter to yield downwardly in emergencies. These springs are suitably anchored to the axle 28 so as to avoid the possibility of the slipping out of the springs 34 from beneath the axle, this also being true with respect to the seats to avoid the said springs slipping off of the same in the working of the gauge.

The work 33 is held between a pair of work holding bars or slats 36 which are arranged parallel with each other and are releasably disposed transversely of the frame or stand A, being pegged or keyed at 37 to the side sills 10 of the said frame or stand A.

Arranged at opposite ends of the carriage 15 are fulcrum ledges or plates 38 which function to fulcrum alternately opposite ends of the work 33 so as to assure the proper set of the work in a tilting position as governed by the gauge with respect to the blade or knife 26 on reciprocation of the carriage 15 for reverse stroking action thereof. In this manner the shakes or shingles are split from the bottom face of the block 33 without the necessity of having to turn the block from end to end and assuring a tapering thickness from butt to tip of the said shakes or shingles thus split or cut in the operation of the machine.

In the frame or stand A and located in the path of reverse movements of the rocking gauge is a pair of resilient tripping switches 39, which alternately under reverse movements of the carriage 15 operate upon the tilting gauge to reverse the tilt thereof so that the block 33 will be cut from both ends in the splitting of shakes or shingles therefrom. These switches 39 are supported upon transverse bars 40 arranged crosswise of the frame or stand A and fixed to the bottom edges of the side sills 10 thereof, the shoes 29 being adapted to ride upon the switches 39 and in this manner the tilting gauge will be reversely and alternately tilted under the reciprocation of the carriage 15 in the working of the machine for shake splitting or shingle making operation thereof.

The fulcrum ledges or plates 38 on the carriage 15 constitute end rests for the block 33 so as to slant such block while the rocking gauge regulates the extent of slant of the block 33 with relation to the knife or blade 26 so that the shakes or shingles when split or cut from the block will taper from the butt to the tip ends thereof.

The adjusting screws 31 in the shoes 29 are readily accessible for their adjustment to limit the extent of the swing or rocking action of the gauge.

The ledges or plates 38 are detachably secured in place at opposite ends of the carriage 15.

The springs 34 acting upon the axle 28 of the rocking gauge function to hold the latter yieldably in its elevated position in the carriage 15. The work 33, which is in the form of a block, on introduction into the machine is placed upon the carriage 15 so that one end of the block will be at rest at the high portion of the fulcrum ledge or plate 38 while the other end of said block will rest upon the gauge plate 30 next thereto of the gauge, the latter being in a determined sloping position to hold the block 33 at a required angle to a horizontal plane so that on contact of the said block 33 with the abutment 37 on the frame 10 upon movement of the carriage 15 in one direction the knife or blade 26 will cut the block for the purpose hereinbefore set forth.

What is claimed is:

1. A machine of the kind described comprising a stationary support, spaced parallel tracks fixed in said support, a carriage reciprocatingly movable upon said tracks, a double edged cutting blade fixed transversely of the carriage intermediate thereof, a work holder above the carriage and holding the work in the path of said blade, rocking means fitted with the carriage and acting upon the work in the holder for reversely inclining the same with relation to the blade when the latter has moved to opposite sides of said work, means adjustably fitted with the first-named means for varying the inclined lay of the work with relation to the blade, means on the support in the path of the first-named means for automatically reversing the same on reciprocation of said carriage, and a spring-tensioned displaceable arbor for yieldably supporting the said first-named means.

2. A machine of the kind described comprising a stationary support, spaced parallel tracks fixed in said support, a carriage reciprocatingly movable upon said tracks, a double edged cutting blade fixed transversely of the carriage intermediate thereof, a work holder above the carriage and holding the work in the path of said blade, rocking means fitted with the carriage and acting upon the work in the holder for reversely inclining the same with relation to the blade when the latter has moved to opposite sides of said work, means adjustably fitted with the first-named means for varying the inclined lay of the work with relation to the blade, means on the support in the path of the first-named means for automatically reversing the same on reciprocation of said carriage, a spring-tensioned displaceable arbor for yieldably supporting the said first-named means, and fulcrum ledges mounted on the carriage at opposite sides of the first-named means for effecting proper set of the work in the work holder and cooperating with said first-named means at the completing of the movement of the carriage in one direction.

ELSWORTH H. JENKINS.